US012594624B2

(12) United States Patent
  Woratz

(10) Patent No.:  US 12,594,624 B2
(45) Date of Patent:       Apr. 7, 2026

(54) MACHINING APPARATUS FOR LASER MACHINING A WORKPIECE, METHOD FOR LASER MACHINING A WORKPIECE

(71) Applicant: BYSTRONIC LASER AG, Niederönz (CH)

(72) Inventor: Colin Woratz, Bern (CH)

(73) Assignee: BYSTRONIC LASER AG, Niederönz (CH)

( * ) Notice: Subject to any disclaimer, the term of this patent is extended or adjusted under 35 U.S.C. 154(b) by 986 days.

(21) Appl. No.: 17/642,065

(22) PCT Filed: Sep. 17, 2020

(86) PCT No.: PCT/EP2020/076033
  § 371 (c)(1),
  (2) Date: Mar. 10, 2022

(87) PCT Pub. No.: WO2021/053105
  PCT Pub. Date: Mar. 25, 2021

(65) Prior Publication Data
  US 2022/0379402 A1      Dec. 1, 2022

(30) Foreign Application Priority Data
  Sep. 18, 2019   (DE) ..................... 10 2019 125 103.6

(51) Int. Cl.
  *B23K 26/067*      (2006.01)
  *B23K 26/38*       (2014.01)
(52) U.S. Cl.
  CPC .......... *B23K 26/0676* (2013.01); *B23K 26/38* (2013.01)

(58) Field of Classification Search
  CPC ............................ B23K 26/38; B23K 26/0676
  (Continued)

(56) References Cited

U.S. PATENT DOCUMENTS

| 4,398,790 A | * | 8/1983 | Righini | .................. | B23K 26/06 |
| | | | | | 606/17 |
| 4,421,382 A | * | 12/1983 | Doi | ........................ | A61B 18/22 |
| | | | | | 385/115 |

(Continued)

FOREIGN PATENT DOCUMENTS

| CN | 1730226 A | 2/2006 |
| CN | 106271046 A | 1/2017 |

(Continued)

OTHER PUBLICATIONS

International Preliminary Report on Patentability, mailed Jan. 20, 2022, from PCT/EP2020/076033 filed Sep. 17, 2020.

(Continued)

*Primary Examiner* — Jimmy Chou
(74) *Attorney, Agent, or Firm* — Workman Nydegger

(57)            ABSTRACT

A machining apparatus for laser machining a work-piece, in particular for laser cutting, is provided, having a device for generating a machining laser beam, for rough machining the work-piece, in particular for producing cuts with cut edges in the workpiece, and having a device for splitting the machining laser beam into at least two energy intensity ranges, wherein a first energy intensity range for rough machining of the workpiece has a greater time-integrated radiation energy than at least one second energy intensity range for at least partially fine machining a cut edge. Further provided is a method a for laser machining a workpiece.

6 Claims, 7 Drawing Sheets

Figure 1A:
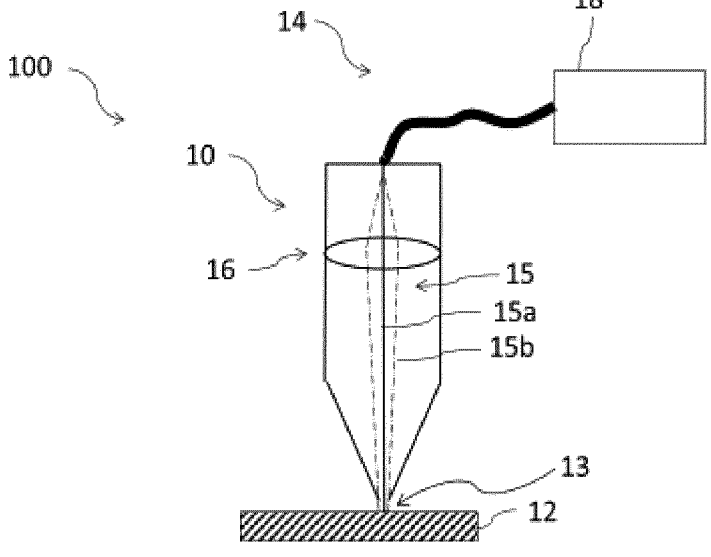

(58) Field of Classification Search
USPC .................................................... 219/121.6
See application file for complete search history.

(56) References Cited

U.S. PATENT DOCUMENTS

| | | | | | |
|---|---|---|---|---|---|
| 4,575,181 | A * | 3/1986 | Ishikawa | ............ | B23K 26/0643 |
| | | | | | 385/33 |
| 6,008,469 | A * | 12/1999 | Kawamura | ......... | G02B 6/4296 |
| | | | | | 359/636 |
| 6,072,929 | A * | 6/2000 | Kato | ................. | G02B 6/02271 |
| | | | | | 385/127 |
| 6,160,568 | A * | 12/2000 | Brodsky | ........... | B23K 26/0643 |
| | | | | | 372/75 |
| 6,275,250 | B1 * | 8/2001 | Sanders | .............. | B23K 26/032 |
| | | | | | 347/237 |
| 6,476,350 | B1 * | 11/2002 | Grandjean | ............ | B23K 26/06 |
| | | | | | 219/121.22 |
| 6,515,257 | B1 * | 2/2003 | Jain | ...................... | B23K 26/382 |
| | | | | | 219/121.73 |
| 6,614,975 | B2 * | 9/2003 | Richardson | ......... | H01S 3/06708 |
| | | | | | 385/127 |
| 7,592,568 | B2 * | 9/2009 | Varnham | ........... | B23K 26/0734 |
| | | | | | 219/121.73 |
| 8,781,269 | B2 * | 7/2014 | Huber | ................... | G02B 6/262 |
| | | | | | 385/18 |
| 8,822,881 | B2 * | 9/2014 | Feng | ................... | G11B 5/4853 |
| | | | | | 219/121.64 |
| 8,933,374 | B2 * | 1/2015 | Hayashi | ............ | B23K 26/0624 |
| | | | | | 219/121.81 |
| 9,435,964 | B2 * | 9/2016 | Tayebati | .................. | H01S 3/23 |
| 9,823,422 | B2 * | 11/2017 | Muendel | ............. | G02B 6/4216 |
| 10,088,632 | B2 * | 10/2018 | Zhou | ........................ | G02B 6/32 |
| 10,281,656 | B2 * | 5/2019 | Huber | ................. | G02B 6/4296 |
| 10,625,373 | B2 * | 4/2020 | Popp | ...................... | B23K 26/08 |
| 10,630,047 | B2 * | 4/2020 | Zhou | ..................... | G02B 6/04 |
| 10,682,726 | B2 * | 6/2020 | Gross | ................. | B23K 26/064 |
| 10,768,373 | B2 * | 9/2020 | Zhou | ........................ | H01S 5/005 |
| 11,215,761 | B2 * | 1/2022 | Huber | ................. | G02B 6/3508 |
| 11,435,538 | B2 * | 9/2022 | Zhou | .................. | G02B 6/4296 |
| 11,480,846 | B2 * | 10/2022 | Tayebati | ........... | B23K 26/0626 |
| 2002/0006256 | A1 * | 1/2002 | Inagaki | ............. | G02B 6/03677 |
| | | | | | 385/123 |
| 2005/0072943 | A1 * | 4/2005 | Yamanaka | .......... | G02B 6/4206 |
| | | | | | 250/504 R |
| 2006/0219673 | A1 * | 10/2006 | Varnham | ........... | B23K 26/0734 |
| | | | | | 219/121.85 |
| 2006/0249491 | A1 * | 11/2006 | Jurgensen | .......... | B23K 26/0676 |
| | | | | | 219/121.76 |
| 2007/0017905 | A1 * | 1/2007 | Breitschafter | ..... | B23K 26/0622 |
| | | | | | 219/121.61 |
| 2007/0119834 | A1 * | 5/2007 | Briand | ................. | B23K 26/123 |
| | | | | | 219/121.72 |
| 2009/0236324 | A1 * | 9/2009 | Fukuyo | .............. | B23K 26/0622 |
| | | | | | 219/121.72 |
| 2009/0294423 | A1 * | 12/2009 | Hu | ........................ | B23K 26/389 |
| | | | | | 219/121.72 |
| 2013/0223792 | A1 * | 8/2013 | Huber | ............... | G02B 6/02042 |
| | | | | | 385/127 |
| 2013/0272668 | A1 * | 10/2013 | Sato | ................... | G02B 6/03683 |
| | | | | | 385/123 |
| 2014/0034625 | A1 * | 2/2014 | Daniel | ................... | B23K 26/38 |
| | | | | | 219/121.72 |
| 2014/0054274 | A1 * | 2/2014 | Chagnot | ............... | B23K 26/14 |
| | | | | | 219/121.72 |
| 2014/0263209 | A1 * | 9/2014 | Burris | .................... | B22F 12/43 |
| | | | | | 219/121.75 |
| 2015/0001195 | A1 * | 1/2015 | Okada | ................... | B23K 26/38 |
| | | | | | 219/121.84 |
| 2015/0014889 | A1 * | 1/2015 | Goya | ................. | B23K 26/0652 |
| | | | | | 219/121.72 |
| 2015/0049987 | A1 * | 2/2015 | Grasso | ................. | G02B 6/4204 |
| | | | | | 385/33 |
| 2015/0076125 | A1 * | 3/2015 | Toyosawa | .............. | B23K 26/08 |
| | | | | | 219/121.79 |
| 2015/0190882 | A1 * | 7/2015 | Ruettimann | .......... | H01S 3/0064 |
| | | | | | 219/121.61 |
| 2015/0241632 | A1 * | 8/2015 | Chann | .................. | G02B 6/4296 |
| | | | | | 385/27 |
| 2015/0280396 | A1 * | 10/2015 | Tayebati | ............. | H01S 5/02365 |
| | | | | | 372/36 |
| 2015/0293306 | A1 * | 10/2015 | Huber | .................. | B23K 26/067 |
| | | | | | 385/18 |
| 2015/0331205 | A1 * | 11/2015 | Tayebati | .............. | G02B 6/2706 |
| | | | | | 385/27 |
| 2015/0362739 | A1 * | 12/2015 | Zambuto | ........... | G02B 19/0057 |
| | | | | | 359/566 |
| 2015/0364900 | A1 * | 12/2015 | Chann | ................. | H01S 3/08009 |
| | | | | | 385/31 |
| 2015/0378184 | A1 * | 12/2015 | Tayebati | .............. | G02F 1/0147 |
| | | | | | 250/492.1 |
| 2016/0116679 | A1 * | 4/2016 | Muendel | ........... | B23K 26/0626 |
| | | | | | 385/11 |
| 2016/0158889 | A1 * | 6/2016 | Carter | .................. | C30B 11/006 |
| | | | | | 219/76.1 |
| 2016/0193693 | A1 * | 7/2016 | Goya | ................. | B23K 26/0622 |
| | | | | | 219/121.69 |
| 2016/0274539 | A1 * | 9/2016 | Smithwick | ........... | G03H 1/2645 |
| 2017/0031105 | A1 * | 2/2017 | Huber | .................. | G02B 6/3508 |
| 2017/0209959 | A1 * | 7/2017 | Popp | .................. | B23K 26/0626 |
| 2017/0219808 | A1 * | 8/2017 | Mori | .................. | G02B 19/0014 |
| 2017/0293084 | A1 * | 10/2017 | Zhou | ....................... | G02B 17/00 |
| 2018/0026425 | A1 * | 1/2018 | Usuda | ................... | H01S 5/4025 |
| | | | | | 372/32 |
| 2018/0031762 | A1 * | 2/2018 | Bookbinder | ....... | G02B 6/03666 |
| 2018/0088358 | A1 * | 3/2018 | Kliner | .................. | B29C 64/264 |
| 2018/0159299 | A1 * | 6/2018 | Zhou | ....................... | G02B 6/04 |
| 2018/0210144 | A1 * | 7/2018 | Villarreal-Saucedo | ..................... |  |
| | | | | | G02B 6/03605 |
| 2018/0212395 | A1 * | 7/2018 | Kliner | ................... | H01S 3/121 |
| 2018/0214950 | A1 * | 8/2018 | Karlsen | ............... | B23K 26/342 |
| 2019/0265419 | A1 * | 8/2019 | Tayebati | ................. | H01S 3/23 |
| 2019/0363519 | A1 * | 11/2019 | Lochman | ............ | H01S 5/02326 |
| 2020/0310055 | A1 * | 10/2020 | Mordarski | ............ | G02B 6/262 |

FOREIGN PATENT DOCUMENTS

| | | |
|---|---|---|
| CN | 108620746 A | 10/2018 |
| DE | 102008037042 A1 | 2/2010 |
| JP | 2013136103 A | 7/2013 |

OTHER PUBLICATIONS

International Search Report and Written Opinion, mailed Jan. 29, 2021, from PCT/EP2020/076033 filed Sep. 17, 2020.
Chinese First Office Action, mailed Apr. 25, 2023, from Chinese Patent Application No. 202080064937.9.

* cited by examiner

MACHINING APPARATUS FOR LASER MACHINING A WORKPIECE, METHOD FOR LASER MACHINING A WORKPIECE

The present invention relates to a machining apparatus for laser machining a workpiece, use of a machining apparatus for laser machining a workpiece and a method for laser machining a workpiece.

Laser machining apparatuses are used in the laser machining of workpieces, in particular in methods for the thermal separation of materials by means of laser radiation, such as laser cutting. In many cases, a laser machining head is used to guide the machining laser beam onto the workpiece, for example onto a sheet to be machined. A main requirement when machining workpieces is to improve the quality of the machined workpiece. Laser cutting typically uses an auxiliary gas or cutting gas that can be active or inert.

In flatbed cutting systems, for example, the workpiece is processed with a laser beam and a gas jet that serves as the cutting gas. The machining head is thus configured as a cutting head and directs the two beams to the workpiece in an optimal manner.

When laser cutting with an active cutting gas, such as oxygen, the metal material of the workpiece, for example, is burned and vaporised after it has been heated to the ignition temperature by the laser beam. The reaction between oxygen and the material of the workpiece generates additional heat that supports the cutting process. The melted liquid material, which has a low viscosity, can be removed from the cut edge or from the cutting gap by the shear forces of the gas. When cutting with an inert gas such as nitrogen or argon, the material of the workpiece is only melted by the laser power and can be blown out of the cutting gap by the kinetic energy of the gas stream.

Unwanted structures of the generated surfaces of the workpiece can arise during laser machining of workpieces. For example, unwanted surface irregularities can be generated in the cutting gap and/or on the cut edge during laser cutting. These can result from the high energy input during rough machining, e.g. cutting, with the laser beam. One type of surface irregularity can result from a melting of the material which varies periodically due to the laser beam and the gas stream, as a result of which undesirable irregular profiles of the surfaces or so-called grooves arise. Another type of surface irregularity arises from the fact that a melt film can be formed at least a few millimetres deep in the cutting gap, which the surface covers, for example by surface unevenness created previously by cutting. In addition, undesirably shaped or sharp-edged cut edges can arise during laser cutting. These can not only be difficult to handle during further processing of the workpiece, but can also lead to edge alignment during painting and impair the corrosion resistance of the workpiece. The same applies to other laser machining processes. There is therefore a need for a method and a device which have a favourable influence on the surface finishes of the machined workpieces, in particular the haptics and machinability of workpieces machined with laser beams, and the visual appearance of visible parts.

CN106271046A discloses a laser etching method and device. CN108620746A relates to a laser-based road surface cutting device which comprises a laser device, a beam splitting unit, a first output unit, a second output unit and a cutting and translation table. DE102008037042A1 describes an apparatus for shaping a laser beam, comprising symmetrizing means which can interact with the laser beam to be shaped in such a way that, after the interaction, at least two sections or partial beams of the laser beam different in the transverse direction of the laser beam are spatially coherent to one another in points or areas, as well as superimposing means for superimposing the at least two sections or partial beams with one another, the superimposing means being arranged in the beam path of the laser beam behind the symmetrizing means. According to U.S. 2017/293084A1 the beam parameter product and/or numerical aperture of a laser beam is adjusted utilizing a step-clad optical fiber having a central core, a first cladding, an annular core, and a second cladding. According to EP0882540A1 a laser beam produced by a laser oscillator and guided into a machining head through a transmitter is split into a plurality of beams by a plane reflecting mirror. The laser beams thus split are reflected by another reflecting mirror having a single paraboloidal surface so as to be converged on focal points.

It is the aim of the invention to provide a machining apparatus and a method for laser machining a workpiece, which facilitate a favourable surface finish of the workpiece.

This is achieved by a machining apparatus for laser machining a workpiece, use of a machining apparatus and a method for laser machining a workpiece.

In one embodiment of the invention, a machining apparatus for laser cutting a workpiece is provided, having a device for generating a machining laser beam, for rough machining the workpiece and for producing cuts with cut edges in the workpiece, and having a device for splitting the machining laser beam into at least two energy intensity ranges of which a first energy intensity range for rough machining of the workpiece has a greater time-integrated radiation energy than at least one second energy intensity range for at least partially fine machining a cut edge, wherein the first energy intensity range is a core region of the machining laser beam and the at least one second energy intensity range is at least one edge region of the machining laser beam; wherein the first energy intensity range and the at least one second energy intensity range are arranged concentrically; the energy intensity ranges being adapted for rough and fine machining by the device for splitting the machining laser beam; wherein the machining apparatus contains a control unit; and wherein at least one element selected from the device for splitting the machining laser beam and the device for generating a machining laser beam is connected to the control unit in a wired or wireless data-carrying manner and is controllable with the control unit.

The machining apparatus enables a targeted use of different energy intensity ranges of the machining laser beam for different purposes, in particular for rough and fine processing. The different energy intensity ranges can be adapted by the device for splitting the machining laser beam for the respective application. During rough machining, the workpiece can be machined with the first energy intensity range. When at least partially fine machining the cut edge, the workpiece can be machined with the second energy intensity range. The first energy intensity range is thus provided with a higher time-integrated radiation energy than the second energy intensity range. Therefore, a cut edge generated during rough machining with the first energy intensity range can be treated with the second energy intensity range and thus with a lower time-integrated radiation energy than during rough machining. For example, an area of the machining laser beam that contains a lower time-integrated radiation energy and is therefore not used for rough machining, for example an edge region of the machining laser beam, for which fine processing is used. As a result, the surface structure of the cut edge is refined and processed. For example, the cut edges generated during rough machining can be at least partially rounded and/or chamfered during fine machining. In addition, sharp-edged projections or corners of cut edges can be smoothed. This leads to a refinement of the generated surfaces. Additional post-processing of the produced surfaces, in particular the cut edge, can be omitted. Thus, the machining apparatus of embodiments enables a significant increase in efficiency and a cost saving when machining workpieces. In addition, the finished workpiece is easier to handle during further processing. In particular, edge alignment can be avoided when painting. Furthermore, the refinement of the generated surfaces can promote the corrosion resistance of the workpiece. The haptics, machinability, quality and the visual appearance of workpieces machined with laser beams are thus optimised.

The fine machining is preferably carried out at the same time as the rough machining. Fine machining can therefore be carried out without any loss of time. This means that the simultaneous fine machining can improve the cut quality of machined cut edges in the same period of time as the rough machining is being carried out. In the prior art, this cutting quality would only be possible with a time-consuming reworking of the cut edges after rough machining.

The device for generating a machining laser beam can have a machining laser source which has a plurality of laser source modules having at least one first laser source module and at least one further laser source module for generating the energy intensity ranges of the machining laser beam. The device for splitting the machining laser beam can have a laser beam transport fibre having a first fibre region which is a fibre core, and at least one further fibre region in the form of a fibre jacket ring. The at least one first laser source module can be designed for generating the first energy intensity range of the machining laser beam and can be coupled to the first fibre region of the laser beam transport fibre in a laser light-conducting manner. The at least one further laser source module can be designed for generating one of the second energy intensity ranges of the machining laser beam and can be coupled to each of the further fibre regions assigned thereto in a laser light-conducting manner. In this way, by means of the modules of the machining laser source, several areas of the machining laser beam with different energy intensity and different time-integrated radiation energy can be generated, which are directed in a targeted manner to the machining area of the workpiece, for example to the cut edge, by means of the respectively assigned fibre regions. In particular, the different energy intensity ranges of the machining laser beam can be guided onto the workpiece at the same time. The first fibre region can guide the first energy intensity range of the laser beam, which is used for rough machining, onto the workpiece. The at least one further fibre region can guide one or a plurality of further energy intensity ranges of the laser beam onto the workpiece, which contain less time-integrated radiation energy than for rough machining and are used for fine machining. Furthermore, the modules of the machining laser source and/or the fibre regions can be designed and/or used in a variable and/or targeted manner. In this way, rough machining and fine machining can be carried out flexibly and according to requirements. This is possible, for example, by a suitable choice of the arrangement, the number and/or the width of the fibre regions, the wavelength/frequency of the light generated in the modules and/or by means of independent control of the energy in the respective modules and/or fibre regions.

The fine machining of a cut edge, for example in the edge region of the cut edge, can also take place later than the rough machining (or cutting), for example if simultaneous machining is not possible or efficient due to the cut geometry.

In the machining apparatus, the device for generating a machining laser beam can comprise a machining laser source and optionally a laser beam transport fibre and the device for splitting the machining laser beam can have an optical element for shaping the beam of the machining laser beam. With this embodiment, a plurality of energy intensity ranges of the machining laser beam with different time-integrated radiation energy can be generated by means of beam shaping, which are directed in a targeted manner to the machining area of the workpiece. For example, a machining laser beam can be generated which has a desired intensity distribution and/or a spatial structure at least perpendicular to its direction of propagation, which is designed to be suitable for rough machining and/or fine machining.

The element for beam shaping can, for example, be an optical element that effects a static and/or dynamic beam shaping. A static beam former, for example a beam shaping lens, can be provided for the static beam shaping. For the static and/or dynamic beam shaping, for example, one or a plurality of tilting mirrors (for example a tip/tilt piezo scanner or a galvanometer scanner) that can be adjusted with one or more actuators can be used. A surface deformable with actuators, for example an adaptive or deformable mirror, can also be used for the beam shaping of laser beams. If surface areas of such a mirror can be quickly adjusted independently of one another, for example with frequencies of more than 100 Hz, dynamic beam shaping can be performed with such mirrors. The dynamic beam shaping can in particular be carried out as a high-frequency beam shaping, for example as a focal point oscillation. Alternatively or additionally, the beam shaping element can be used to change the focal length of an optical system of the machining apparatus and/or to adjust the focus position of the machining laser beam.

In the machining apparatus of embodiments, the first energy intensity range is a core region of the machining laser beam. Alternatively or additionally, the at least one second energy intensity range is at least one edge region of the machining laser beam. Furthermore, the first energy intensity range and the at least one second energy intensity range are arranged concentrically. These measures enable, for example, rough machining of the workpiece with the core region of the laser beam and simultaneous fine machining with the at least one edge region.

In the embodiments of the machining apparatus, the device for splitting the machining laser beam can be designed such that it adjusts or selects at least two of the energy intensity ranges independently of one another. In this way, rough machining and/or fine machining of the workpiece can be designed to be highly variable.

Furthermore, the device for splitting the machining laser beam can be designed such that it adjusts or selects the time-integrated radiation energy of the at least one second energy intensity range with increasing distance from the first energy intensity range. The at least one second energy intensity range of the laser beam can be, for example, one or more edge regions of the laser beam which are concentric with the core region. The distribution of the time-integrated radiation energy in the machining laser beam can thus be tailored perpendicular to its direction of propagation, in particular for the fine machining of the workpiece.

In the embodiments, the device for splitting the machining laser beam can be designed such that it adjusts or selects at least one element from one or a plurality of powers of the machining laser source or the laser source modules, an intensity distribution of the machining laser beam, in particular an intensity distribution perpendicular to the direction of propagation of the machining laser beam, one or a plurality of frequencies of the machining laser beam and/or at least one of the energy intensity ranges of the machining laser beam, a spatial structure of the machining laser beam, in particular a width and/or a diameter of the machining laser beam, a spatial structure and/or arrangement of the first energy intensity range and/or the at least one second energy intensity range, a feed rate of the machining laser beam, a focus diameter of the machining laser beam and/or of at least one of the energy intensity ranges, a focal position of the machining laser beam and/or of at least one of the energy intensity ranges, and a focusing of the machining laser beam and/or of at least one of the energy intensity ranges. These modifications of the device for splitting the machining laser beam each promote a highly variable design of the rough machining and/or the fine machining of the workpiece. For example, the energy input into the material of the workpiece can be controlled by the relative speed of the machining laser beam to the workpiece. This can be achieved by a controlled movement of the machining laser beam, for example by high-frequency beam oscillation.

In the embodiments, the device for dividing the machining laser beam can be designed to modify the geometry of the cut edge, in particular for rounding and/or chamfering the cut edge. In this way, a desired haptic, further machinability, quality and optical appearance of workpieces machined with laser beams and cut edges produced thereby can be obtained.

In the machining apparatus of the embodiments, a device for guiding a machining gas, in particular a cutting gas, onto the workpiece can be provided. Alternatively or additionally, a device for guiding a machining gas onto the workpiece can be provided, having a nozzle-shaped outlet opening for the machining gas, which has a diameter of 0.5 to 30 mm, preferably 0.7 to 1 mm, and is adjustable in a distance from the workpiece, in particular to the cut edge, from 0 to 3 mm, preferably 0.1 to 0.3 mm.

Through a suitable choice and control of the device for guiding a machining gas onto the workpiece, molten material can be moved or removed from the cut edge in a targeted manner by means of a gas flow not only during rough machining but also during fine machining, thus optimising the geometry of the cut edge. The device for guiding a machining gas with a nozzle-shaped outlet opening and the diameters and distances from the workpiece mentioned can be used for simultaneous rough machining and fine machining. This embodiment enables a pressure cushion to be generated during the simultaneous rough machining and fine machining over the workpiece with the machining or cutting gas, which pressure pad suitably moves or displaces the molten material both during rough machining and during the fine machining of the workpiece. The machining gas, which is used for rough machining, for example, as a cutting gas, can also be used for fine machining.

The invention further relates to use of a machining apparatus according to any one of the preceding embodiments for at least partially fine machining a cut edge of a workpiece.

In addition, the invention relates to a method for laser cutting a workpiece, in particular with a machining apparatus according to any one of the preceding embodiments, including generating a machining laser beam, for rough machining the workpiece and for producing cuts with cut edges in the workpiece; generating at least two energy intensity ranges of the machining laser beam, splitting the machining laser beam into at least two energy intensity ranges of which a first energy intensity range for rough machining of the workpiece has a greater time-integrated radiation energy than at least one second energy intensity range for at least partially fine machining a cut edge, wherein the first energy intensity range is generated as a core region of the machining laser beam and the at least one second energy intensity range is generated as at least one edge region of the machining laser beam; wherein the first energy intensity range and the at least one second energy intensity range are arranged concentrically; wherein the energy intensity ranges are adapted for rough and fine machining by the device for splitting the machining laser beam; irradiating the workpiece with the machining laser beam, rough machining of the workpiece with the first energy intensity range and at least partially fine machining a cut edge of the workpiece with the at least one second energy intensity range.

In the method of the embodiments, the fine machining is preferably carried out simultaneously with the rough machining. This enables, for example, rough machining of the workpiece with a high time-integrated radiation energy of a core region of the laser beam and simultaneous fine machining of the cut edge with a lower time-integrated radiation energy of at least one edge region of the laser beam.

As already stated, the fine machining of a cut edge, for example in the edge region of the cut edge, can also take place later than the rough machining (or cutting), for example if simultaneous machining is not possible or efficient due to the cut geometry. For example, the fine machining can also be carried out on the underside of the workpiece during reworking, i.e. after rough machining.

According to further embodiments of the method, the energy intensity ranges of the machining laser beam can be generated with a plurality of laser source modules, wherein the first energy intensity range is generated with at least one first laser source module and the at least one second energy intensity range is generated with at least one further laser source module; and the energy intensity ranges of the machining laser beam are coupled into a laser beam transport fibre with a first fibre region which is a fibre core, and at least one further fibre region which is at least one fibre jacket ring. Thus, the first energy intensity range of the machining laser beam can be coupled into the first fibre region, and each of the second energy intensity ranges of the machining laser beam can be coupled into a respectively assigned further fibre area.

In further embodiments of the method, the energy intensity ranges of the machining laser beam can be generated by means of beam shaping. The beam shaping of the machining laser beam can be carried out in various ways. Beam shaping can be understood to mean changing the beam parameter product of the laser beam and/or changing the mixture of the electromagnetic laser modes and/or varying the transverse distribution of the power and/or intensity of the laser beam. There is static beam shaping, in which the beam parameter product is adjusted at one time or a plurality of singular (isolated) times. In addition, there is also dynamic beam shaping (DBS), in which the beam parameter product is changed by continuous dynamic movement of the laser beam over a period of time, in an averaged or integrated manner. The dynamic beam shaping can in particular be carried out as a high-frequency beam shaping, for example as a high-frequency beam oscillation or as a focal point oscillation. In laser machining using dynamic beam shaping, the laser beam is moved across the workpiece to be machined at frequencies of, for example, 100 Hz to 10 kHz, i.e. at frequencies that are significantly higher than the typical reaction time between the laser beam and the material. The workpiece is thus machined with a power distribution of the machining laser beam in a time-averaged or time-integrated manner. By means of dynamic beam shaping, almost any power distributions and intensity distributions of the laser beam spot and thus different areas of the machining laser beam can be generated at least perpendicular to the direction of propagation of the machining laser steel.

In the method of the embodiments, the first energy intensity range is generated as a core region of the machining laser beam. The at least one second energy intensity range is generated as at least one edge region of the machining laser beam. The first energy intensity range and the at least one second energy intensity range are arranged concentrically.

In the method of the embodiments, at least two of the energy intensity ranges can be adjusted or selected independently of one another. Furthermore, the time-integrated radiation energy of the at least one second energy intensity range can be adjusted or selected to decrease with increasing distance from the first energy intensity range.

When generating the at least two energy intensity ranges of the machining laser beam, for splitting the machining laser beam into at least two energy intensity ranges at least one element can be adjusted or selected from one or a plurality of powers of the machining laser source or the laser source modules, an intensity distribution of the machining laser beam, in particular an intensity distribution perpendicular to the direction of propagation of the machining laser beam, one or a plurality of frequencies of the machining laser beam and/or at least one of the energy intensity ranges of the machining laser beam, a spatial structure of the machining laser beam, in particular a width and/or a diameter of the machining laser beam, a spatial structure and/or arrangement of the first energy intensity range and/or the at least one second energy intensity range, a feed rate of the machining laser beam, a focus diameter of the machining laser beam and/or of at least one of the energy intensity ranges, a focal position of the machining laser beam and/or of at least one of the energy intensity ranges, and a focusing of the machining laser beam and/or of at least one of the energy intensity ranges. When the cut edge is at least partially finished, the geometry of the cut edge can be modified, in particular the cut edge can be rounded or chamfered.

In the embodiments of the method, with at least partial fine machining of the cut edge, at least one parameter, selected from the power, the spatial structure and/or arrangement of at least one of the energy intensity ranges of the machining laser beam, can be adjusted or selected.

In the method of the embodiments, a machining gas, in particular a cutting gas, can be directed onto the workpiece. Furthermore, during the fine machining of the cut edge, a machining gas can be guided onto the workpiece through a nozzle-shaped outlet opening for the machining gas, which has a diameter of 0.5 to 30 mm, preferably 0.7 to 1 mm, and is adjusted at a distance from the workpiece, in particular from the cut edge, of 0 to 3 mm, preferably 0.1 to 0.3 mm.

With the method for laser machining a workpiece of the above embodiments, the same advantages, operating modes and functions can be realised as with the embodiments of the machining apparatus for laser machining a workpiece, in particular with identical and/or analogous features.

Further features and advantages become apparent from the following description of embodiments, the figures and the dependent claims.

Figures 1B, 1C:
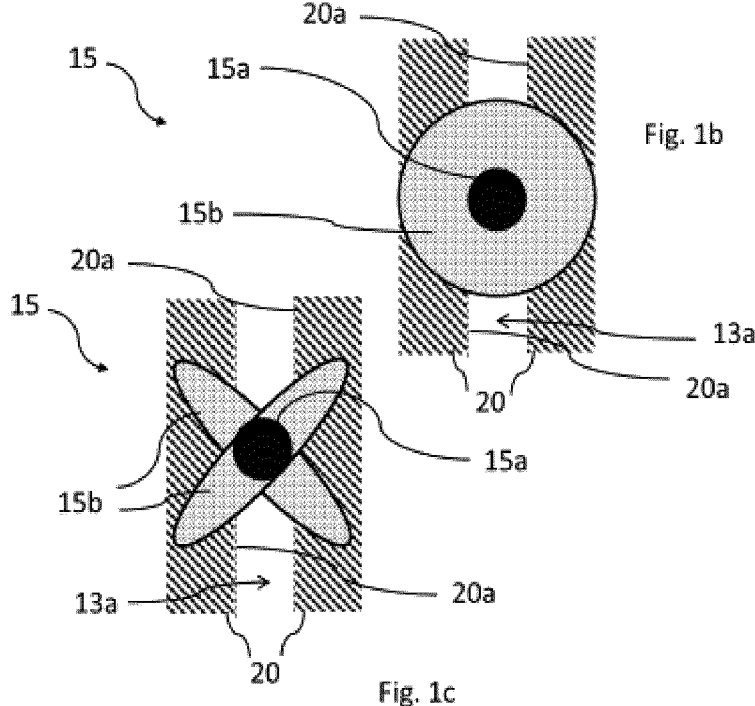
Figure 2A:
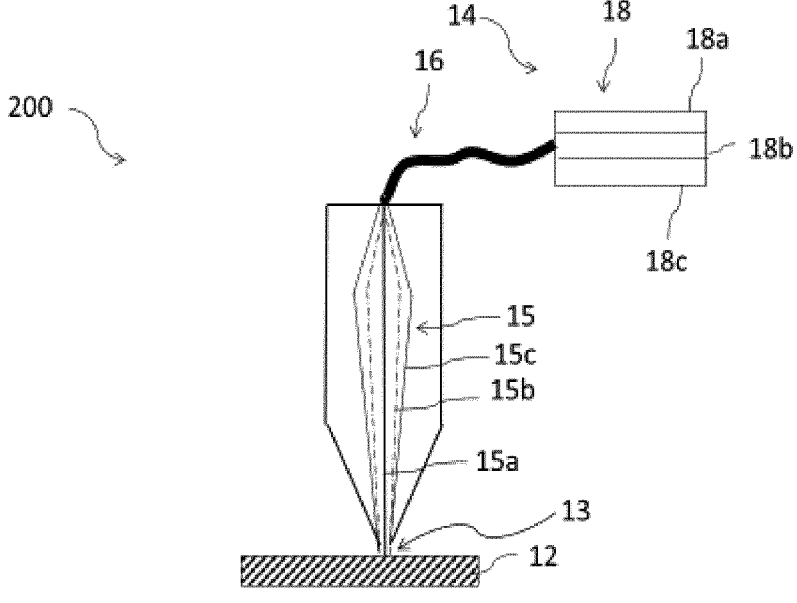
Figures 2B, 2C:
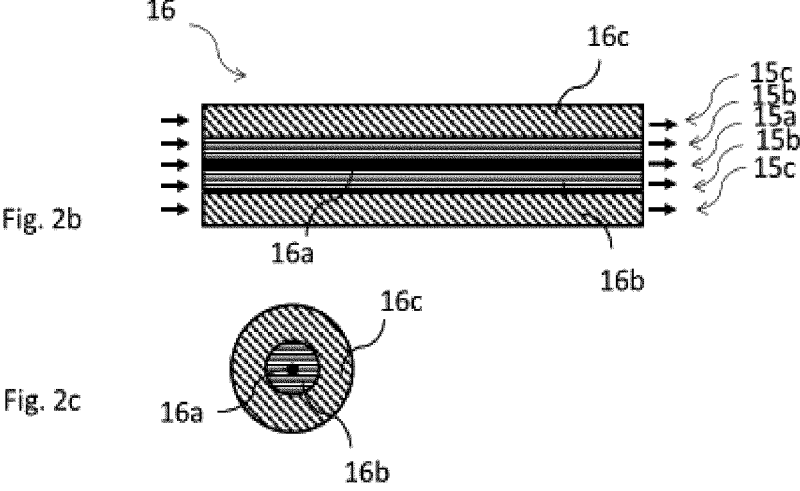
Figure 2D:
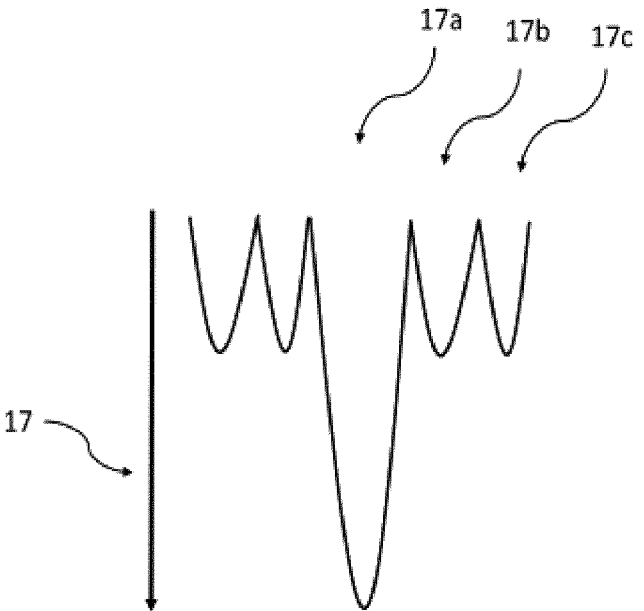
Figures 2E, 2F:
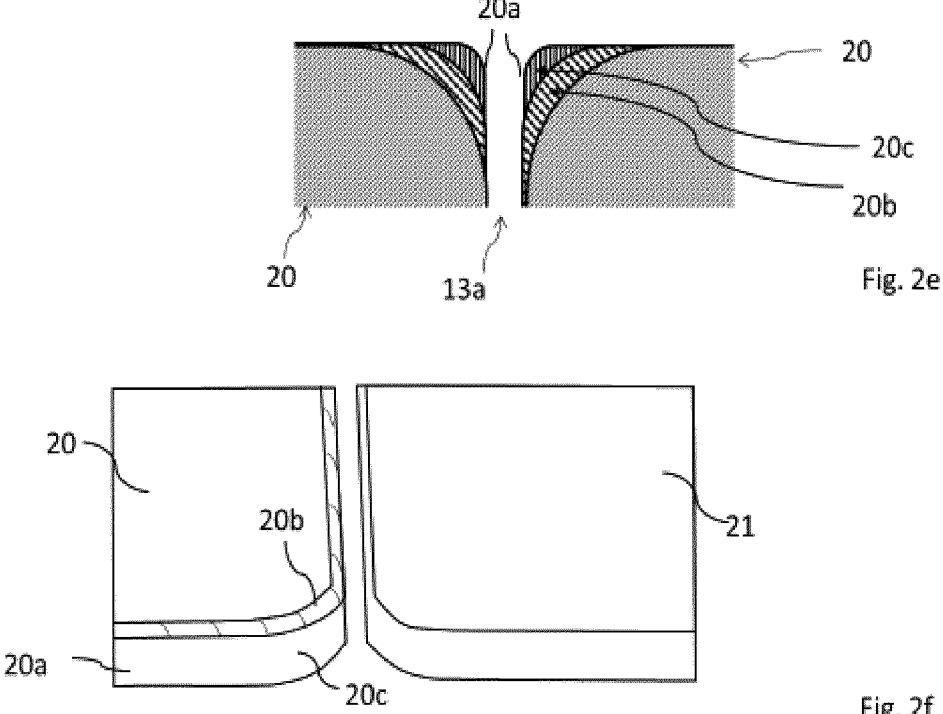
Figure 2G:
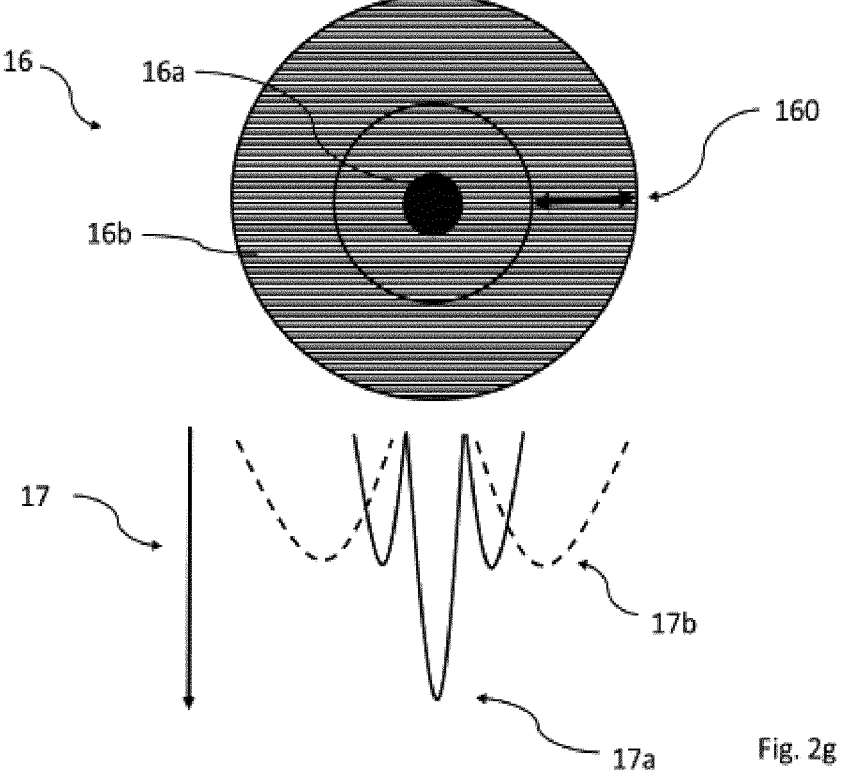

All non-mutually exclusive features of embodiments described here can be combined with one another. The same elements of the embodiments are given the same reference signs in the following description. Individual or a plurality of elements of one embodiment can be used in the other embodiments without further mention. Embodiments of the invention are now described in more detail using the following examples with reference to figures, without intending any limitation thereby. In the figures:

FIG. 1a schematically shows a machining apparatus 100 for laser machining a workpiece as a first example according to embodiments of the invention;

FIG. 1b schematically shows an exemplary laser intensity distribution of a method for laser machining a workpiece having a static optical element in the machining apparatus 100;

FIG. 1c schematically shows an exemplary laser intensity distribution of a method for laser machining a workpiece having a dynamically moveable optical element in the machining apparatus 100;

FIG. 2a schematically shows a machining apparatus 200 for laser machining a workpiece as a second example according to embodiments of the invention;

FIGS. 2b and 2c schematically show elements of the machining apparatus 200 for laser machining a workpiece;

FIGS. 2d to 2f show results of a method for laser machining a workpiece with the machining apparatus 200; and FIG. 2g shows a variation of the machining apparatus 200 for laser machining a workpiece and results of an associated method for laser machining a workpiece.

EXAMPLES

The machining apparatus according to the embodiments of the invention are described below, inter alias by way of examples with a machining head, without limiting the invention thereto. The machining apparatus and the method according to the embodiments of the invention can also be realised without a machining head. The machining laser beam is also referred to synonymously as a laser beam. The term "fine machining" can be expressed as "fine machining". The term "rough machining" can also be synonymously referred to as "coarse machining". The time-integrated radiation energy is also called radiation energy below. The terms "adjust" or "select" include the term "vary". The same applies to variations of these terms.

Furthermore, where value ranges are described here, the specification of a broad range with narrower alternative or preferred ranges is also considered to disclose ranges that may be formed by any combination of specified lower range limits and specified upper range limits.

The term "time-integrated" or "time-averaged" means integrated or averaged over a period of time or a time period. In connection with a focal point oscillation, this means integrated or averaged over at least one oscillation period, integrated or averaged in connection with beam oscillation over at least one oscillation period.

The terms "dynamic movement" of the laser beam or "dynamically moved" laser beam and variants thereof mean that the laser beam is moved at high frequency, for example at frequencies from 10 Hz to 15 kHz, in particular over 500

Hz. The same applies analogously to "dynamically" movable, orientable and/or adjustable elements of the machining apparatus.

In all embodiments, the device for generating a machining laser beam can be designed such that a continuous and/or discontinuous, in particular pulsed, machining laser beam is provided. The machining apparatus, the device for splitting the machining laser beam and/or the device for generating a machining laser beam can be connected to a control unit in a wired or wireless data-carrying manner or contain such a control unit, and can be controllable with the control unit.

FIG. 1a schematically illustrates a first example of a machining apparatus 100 according to embodiments of the invention for laser machining a workpiece 12. In the present example, the machining apparatus 100 is designed with a machining head 10.

The machining apparatus 100 has a machining laser source 18 as a device 14 for generating a machining laser beam 15. As illustrated in the example in FIG. 1a, the machining laser source 18 can be connected to the machining head 10 via a transport fibre. Alternatively, the machining laser source 18 can be provided directly on the machining head 10.

The machining laser beam 15 is also referred to here as a laser beam 15. In the present example, the machining laser source 18 can be used to generate a laser beam 15 which has a core region 15a and an edge region 15b. The latter is shown in FIG. 1a with dashed lines. The core region 15a of the laser beam 15 in the present example corresponds to the first energy intensity range for rough machining and for producing a cut edge 20a (shown in FIGS. 1b and 1c) in a machining area 13 of the workpiece 12. The machining laser source 18 provides a laser power of about 6 kW and generates the machining laser beam in a spectral range which includes a wavelength of 1070 nm. However, machining laser sources with a power lower than 6 kW, for example approx. 1 kW, or with a power greater than 6 kW, for example 10 kW or 20 kW, can also be used. Furthermore, machining laser sources that provide other spectral ranges can also be used.

The machining apparatus 100 also has a device 16 for splitting the machining laser beam into at least two energy intensity ranges. The device 16 for splitting the machining laser beam into at least two energy intensity ranges can be referred to as a device 16 for generating at least two energy intensity ranges of the machining laser beam.

In the present example within the machining apparatus 100, an optical element for shaping the beam of the laser beam is provided as device 16 for splitting the machining laser beam, which is positioned or can be positioned in the beam path of the laser beam 15. The optical element can be designed, for example, as a lens that forms the laser beam 15 and adjusts its intensity distribution perpendicular to its direction of propagation. In the present case, the optical element is designed as a static beam former, with which the edge region 15b of the laser beam 15 can be provided with a lower energy intensity than the core region 15a. Alternatively, an optical element can be provided, which is provided to be dynamically movable, in particular can be moved with high frequency over one or a plurality of time periods with frequencies above 100 Hz, preferably above 500 Hz. For example, a lens can be provided so that it can move dynamically in the beam path of the laser beam 15.

The device 16 for splitting the machining laser beam 15 is thus designed such that it splits the machining laser beam into at least two energy intensity ranges 15a, 15b, wherein a first energy intensity range 15a for rough machining of the workpiece has a greater time-integrated radiation energy than at least one second energy intensity range 15b for at least partially fine machining a cut edge 20a. For this purpose, the device 16 for splitting the machining laser beam 15 and/or the device 14 for generating a machining laser beam 15 can be connected to a control unit (not shown) in a wired or wireless data-carrying manner. The machining apparatus 100 enables a targeted use of different energy intensity ranges of the machining laser beam for different purposes, in particular for rough and/or fine processing.

During operation of the machining apparatus 100, the laser beam 15 is generated with the machining laser source, directed onto the machining area 13 of the workpiece 12 and guided over it at a feed rate. If the lens is provided as the static beam former as the optical element, the laser beam 15 passes through the static beam former. If the optical element is provided as a dynamic beam shaper, this is moved dynamically, in particular over one or a plurality of time periods with frequencies above 100 Hz, preferably above 500 Hz, and thus the laser beam is shaped.

FIG. 1b schematically shows a laser intensity distribution generated with the static beam former perpendicular to the direction of propagation of the laser beam during laser machining of the workpiece with the machining apparatus 100. The static beam shaping divides the laser beam 15 into a core region 15a and an edge region 15b. In the core region 15a, that is to say in the first energy intensity range, the workpiece is exposed to a larger, time-integrated radiation energy than in the edge region 15b, that is to say in the second energy intensity range in this case. In this way, a cutting gap is produced in a region 13a with the core region 15a and the workpiece is separated into two sheets 20, each having a cut edge 20a. The edge region 15b of the machining laser beam 15 is used for the fine machining of the cut edge 20a.

FIG. 1c schematically shows a laser intensity distribution generated with the dynamic beam former perpendicular to the direction of propagation of the laser beam during laser machining of the workpiece with the machining apparatus 100. The dynamic beam shaping divides the laser beam 15 into a core region 15a and a star-shaped edge region 15b. Here too, in the core region 15a, i.e. in the first energy intensity range, the workpiece is exposed to a larger, time-integrated radiation energy than in the star-shaped edge region 15b, that is to say in the second energy intensity range in this case. In this way, a cutting gap is produced in a region 13a with the core region 15a and the workpiece is separated into two sheets 20, each having a cut edge 20a. With the edge region 15b of the machining laser beam 15, which has the lower time-integrated radiation energy, the fine machining of the cut edge 20a is effected.

In this way, the laser beam 15 can be moved dynamically in such a way that its time-integrated intensity distribution perpendicular to the direction of propagation is provided in the further region or edge region 15b with a less time-integrated radiation energy than the first region 15a or core region. The further region 15b need not be circular, as shown in FIG. 1b. Rather, it can have many different shapes due to the dynamically moving beam, which can be achieved, for example, by beam oscillation.

During operation of the machining apparatus 100, the intensity distribution of the laser beam 15 is therefore adjusted perpendicular to the direction of propagation in each case by the static as well as the dynamic beam shaping such that the edge region 15b has less time-integrated radiation energy than the core region 15a. The radiation energy of the core region 15a is adjusted in such a way that laser cutting is carried out and at least one cut edge 20a is formed during the machining of the workpiece. At the same time, the radiation energy of the edge region 15b is adjusted in such a way that the cut edge 20a is subjected to a radiation energy which is lower in comparison to rough machining. In this way, unwanted surface irregularities of the cut edge, such as sharp-edged projections, which are formed by the high radiation energy during rough machining, can be smoothed out immediately, or their formation is avoided. The cut edge can, for example, be rounded and/or chamfered, i.e. bevelled. A desired waterfall profile of the cut edge can also be generated. As a result, the cut edge 20a is refined and processed. Additional post-processing of the produced surfaces can be omitted.

During operation of the machining apparatus 100, fine machining can take place after the rough machining and/or fine machining. For example, after the workpiece has been cut with the core region 15a during rough machining, the edge region 15b of the laser beam can be guided over the cut edge 20a formed in the machining area 13. This fine machining can take place, for example, on the underside of the workpiece during post-machining, that is to say after rough machining and/or fine machining.

In the first example, at least one movable surface reflecting the machining laser beam 15 can be provided as the dynamic beam-shaping optical element of the device 16, which is arranged and aligned in the beam path in such a way that it deflects the processing beam 15. The machining laser beam 15 can thus be deflected within the machining apparatus, for example by 90°, before it is directed onto the workpiece. The reflecting surface is at least partially dynamically movable by means of at least one or more actuators, for example piezo actuators, with which the reflecting surface can be at least partially dynamically adjusted. For example, the at least one movable surface can be dynamically adjusted as a whole by means of at least one actuator. Furthermore, the at least one movable surface can provide a surface unit of the laser beam guiding device whose surface geometry, in particular its curvature, can be dynamically adjusted. As a result, not only can the machining laser beam be shaped and/or moved at least perpendicularly to its direction of propagation, but also the divergence of the machining laser beam can be changed and/or the focal position of the machining laser beam can be shifted parallel to its direction of propagation.

In this way, the intensity distribution of the machining laser beam 15 can be adjusted both in the core region 15a and/or in the edge region 15b. Alternatively or additionally, other properties of the laser beam 15 can be adjusted, selected and/or set for the rough machining and/or fine machining. For example, the spatial structure of the machining laser beam, in particular its beam parameter product, its width and/or its diameter, can be adjusted for fine machining. Furthermore, the spatial arrangement of the core region and/or the edge region of the machining laser beam, the focus diameter of the machining laser beam, the focal position of the machining laser beam, and/or the focusing of the machining laser beam can be suitably adjusted or selected for fine machining.

For example, the device 16 may include a dynamically orientable and planar mirror made of, for example, coated SiC (silicon carbide), which provides the movable surface that reflects the machining laser beam. At least one piezo actuator is provided as the actuator, with which the mirror can be moved dynamically and thereby be oriented. The unit consisting of a mirror and at least one actuator is also called a piezo scanner. In the case of several actuators, each piezo actuator can be controlled individually by means of a control unit (not shown in the figures). For example, it is a piezo actuator based on a modified PZT (lead zirconate titanate) ceramic with a typical drive voltage of 120 V. For laser machining, the mirror with the movable surface is tilted by the at least one piezo actuator such that the machining laser beam 15 is deflected. At the same time, the surface is dynamically moved by the piezo actuators, providing suitable tilt angles for the deflection, so that the machining laser beam 15 is dynamically moved. In this manner, the beam parameter product of the machining laser beam 15 and the intensity distribution of the laser beam spot on the workpiece 12 is designed as desired for the respective method for laser machining, since the focal point of the machining laser beam 15 is dynamically moved to be at least perpendicular to its direction of propagation at frequencies between 10 Hz and 15 kHz and thus the laser beam spot striking the workpiece is shaped.

In a further variation (not shown) of the first example, the device 16 contains a dynamic beam shaper with two movable reflecting surfaces which are part of a galvanometer scanner. For this purpose, the galvanometer scanner can contain two mirrors, each of which provides a movable surface. These can be moved individually and dynamically as actuators, for example by means of individually controllable galvanometers. The galvanometer scanner is provided, for example, with two mirrors orientable such that the machining laser beam 15 is deflected at least once at an angle greater than 90° and at least once at an angle smaller than 90°. During operation, the two mirrors are oriented and moved relative to one another such that the machining laser beam 15 is deflected twice and is simultaneously dynamically moved. As a result, almost any intensity distributions of the beam spot and/or any beam parameter products of the machining laser beam 15 can be provided by means of dynamic beam shaping.

In another variation of the first example, the device 16, as a reflective, dynamically movable surface, can have a segment mirror having a plurality of mirror segments which are separated from one another and arranged next to one another, forming a pattern. Each mirror segment has, for example, a gold coating, is reflective for the machining laser beam 15 and can be individually dynamically oriented by means of a piezo actuator. The device 16 thus provides a segmented total surface reflecting the machining laser beam 15, the surface geometry of which, in particular the curvature thereof, can be adjusted in a highly dynamic manner. The following applications of the segment mirror are possible: The focal length of the optical system of the machining apparatus can be changed with the segment mirror. The segment mirror can be used as zoom optics, i.e. for a focus position adjustment of the machining laser beam, wherein the machining laser beam 15 is deflected by the segment mirror with the desired selectable beam divergence. The segment mirror can also be used as static beam shaping optics. The surface of the segment mirror assumes an adequate controllable surface curvature depending on the desired aberration. Furthermore, the segment mirror can also be used for dynamic beam shaping. For this purpose, the surface of the segment mirror is changed with a sufficiently high frequency above 10 Hz, in particular above 100 Hz, such that the resulting focus on the workpiece 12 is moved dynamically at least laterally to the direction of propagation of the laser beam. The beam parameter product and/or the intensity distribution of the time-integrated machining laser beam can be modified as desired by the static or dynamic beam shaping.

In an additional variation of the first example, the device 16 has a deformable mirror (DM, dynamic mirror) as a dynamically beam-forming optical element in order to provide a movable, reflective, continuous surface. The mirror is formed by a membrane made of deformable material, which is dynamically deformable by means of the actuators. For this purpose, there are individually controllable actuators that are evenly distributed in a pattern on the underside of the membrane. The top of the membrane is coated with a highly reflective dielectric multilayer coating, which is suitable for laser beams up to 120 kW at a wavelength of 1060 to 1090 nm. The movable, reflective, continuous surface of the deformable mirror (DM, dynamic mirror) can be operated in the same way as the previously described segment mirror.

FIGS. 2a to 2g schematically illustrate a second example of a machining apparatus 200 according to embodiments of the invention.

As FIG. 2a shows, in this example the device 14 for generating the machining laser beam 15 has a machining laser source 18 which contains a plurality of laser source modules 18a, 18b, 18c for generating the regions of the machining laser beam 15. The laser source module 18a generates the core region 15a of the laser beam 15, which is intended for rough machining. The laser source modules 18b and 18c generate the edge regions 15b and 15c of the laser beam 15, which are intended for fine machining in the present case. In this example, the laser source modules 18a to 18c provide a laser power in the range from approximately 0.1 kW to 20 kW and generate the machining laser beam in a spectral range, which includes a wavelength of 1070 nm, for example. The laser source modules 18a to 18c can provide different laser powers and/or different spectral ranges. For example, the laser source module 18a can generate a laser power of 20 kW and the laser source modules 18b, 18c can generate laser powers of 0.2 kW.

Furthermore, the device 16 for splitting the machining laser beam 15 has a laser beam transport fibre having a first fibre region, in the present case a fibre core 16a, and at least one further fibre region, in the present case two fibre jacket rings 16b and 16c. The laser source module 18a, which generates the core region 15a of the machining laser beam, is coupled to the fibre core 16a of the laser beam transport fibre in a laser light-conducting manner. Furthermore, the laser source modules 18b and 18c, which generate the edge regions 15b and 15c of the laser beam 15, are coupled to the fibre jacket rings 16b and 16c in a laser light-conducting manner. As FIG. 2b shows in the longitudinal cross section and FIG. 2c in the cross section perpendicular to the longitudinal direction of the fibre, the fibre core 16a is arranged centrally in the laser beam transport fibre and is concentrically enclosed by the fibre jacket rings 16b and 16c. The core region 15a and the edge regions 15b and 15c of the laser beam are therefore also arranged concentrically.

The device 16 for splitting the machining laser beam 15 and the device 14 for generating the machining laser beam 15 are connected in the present example to a control unit (not shown) in a wired or wireless data-carrying manner. Both devices can be controlled in this way.

During operation of the machining apparatus 200, the core region 15a is provided with a higher time-integrated radiation energy than the edge regions 15b and 15c by means of the modules 18a to 18c. This is shown in FIG. 2d, in which the time-integrated radiation energy is illustrated as radiation intensity 17. This can be done, for example, by a suitable choice of the respective powers and/or frequencies of the laser source modules 18a to 18c and thus the powers and/or frequencies of the areas 15a to 15c of the laser beam. For laser machining, the core region 15a and the edge regions 15b and 15c are guided over the workpiece 12. Due to its high radiation energy, a cut edge 20a is formed with the core region 15a of the laser beam 15 on the workpiece 12. For example, the radiation intensity 17a of the core region 15a is adjusted such that laser cutting is carried out in the machining area 13 and at least one cut edge 20a is formed during the machining of the workpiece. At the same time, as shown in FIG. 2d, the radiation intensities 17b and 17c of the edge regions 15b and 15c are adjusted independently of the core region 15a in such a way that the machining area 13 is subjected to a radiation energy which is lower than that of rough machining. In this way, unwanted surface irregularities of the cut edge 20a, such as sharp-edged projections, which are formed by the high radiation intensity of the core region 15a, are smoothed out immediately, or their formation is avoided from the outset. The cut edge 20a can, for example, be rounded and/or bevelled, i.e. chamfered. As a result, the surface structure of the cut edge 20a is refined and processed. Additional post-processing of the produced surfaces can be omitted.

The radiation intensity of the edge regions 15b and 15c can also be adjusted independently of the core region 15a in such a way that the radiation intensities 17b and 17c of the edge regions 15b and 15c of the machining laser beam are adjusted or selected with increasing distance from the core region 15a. In this way, the machining area 13 is exposed to a radiation energy that decreases towards the outside in comparison to rough machining. The cut edge 20a can also be rounded off in this way. The radiation intensities 17b to 17c of the different regions of the laser beam can furthermore be varied in that only one or two of the regions 15a to 15c of the laser beam 15 are generated by the laser source modules 18a to 18c.

FIG. 2e schematically shows an exemplary result of the method of the second example using sheets 20 that were produced by laser cutting. FIG. 2e shows corners of two sheets 20 in a top view from above, which were separated by the laser beam 15. The core region 15a of the laser beam has created a cutting gap between the sheets 20 in a region 13a and a cut edge 20a on each of the sheets 20. The sheets 20 each show a mirror-image of a rounded area 20c of the cut edge 20a and a chamfered area 20b of the cut edge 20a arranged above it. The regions 20b and 20c were generated by the edge regions 15b and 15c of the laser beam.

FIG. 2f schematically shows a sheet 20 cut using the method of the second example on the left and a sheet 21 cut according to the prior art on the right. The rounded or chamfered areas 20c and 20b can be seen on the cut edge 20a of the left sheet 20, in comparison to the sheet 21.

FIG. 2g shows a laser beam transport fibre of the device 16 for splitting the machining laser beam in a modification of the machining apparatus 200 and results of an associated method for laser machining a workpiece. FIG. 2g shows a cross section of the modified laser beam transport fibre perpendicular to the longitudinal direction. The fibre core 16a is arranged centrally in the laser beam transport fibre and is concentrically enclosed by the fibre jacket ring 16b. The fibre jacket ring 16c is not shown. The core region 15a of the laser beam is transported into the fibre core 16a and the edge region 15b of the laser beam is transported into the edge region 16b. The fibre jacket ring 16b is shown here with two different diameters, indicated by the arrow 160. By varying the diameter, as illustrated in FIG. 2g below with reference to the radiation intensity 17, the laser beam 15 is provided with an intensity distribution in which the core region 15a has an intensity 17a and the edge region 15b has an intensity 17b of different widths. By varying the width of the fibre jacket ring 16b, the width of the edge region 15b of the laser beam and thus the width of the region of the fine machining can be varied.

A device for directing a machining gas, in particular a cutting gas, onto the workpiece can be provided in the machining apparatuses 100 or 200 (not shown). For example, the machining head 10 of the machining apparatus 100 shown in FIG. 1a can have a nozzle-shaped outlet opening for the machining laser beam 15. The machining head can be designed in such a way that the machining gas can also be passed through the outlet opening simultaneously with the laser beam 15. The outlet opening can have a diameter of 0.5 to 30 mm, preferably 0.7 to 1 mm, and can be adjusted at a distance from the workpiece, in particular from the cut edge, of 0 to 3 mm, preferably 0.1 to 0.3 mm.

Through a suitable choice and control of the device for guiding the machining gas onto the workpiece, molten material can therefore be moved and/or displaced in a targeted manner by means of a gas flow not only during rough machining but also during fine machining. Depending on the machining process, nitrogen, oxygen, compressed air or argon can be used as the gas. In this way, the geometry of the cut edge 20a can be additionally optimised during fine machining. The device for guiding a machining gas with a nozzle-shaped outlet opening and the diameters and distances from the workpiece mentioned can therefore be used for simultaneous rough machining and fine machining.

In one example, the distance of the outlet opening, which has a diameter of 2 mm, is adjusted to a distance from the workpiece of 0.2 mm during simultaneous rough machining and fine machining. In this way, a pressure cushion is generated above the workpiece 12 with the machining or cutting gas, which moves the molten material in a suitable manner on the surface of the workpiece both during rough machining and fine machining. The machining gas, which is used for rough machining, for example as a cutting gas, can also be used for fine machining and for refining the workpiece surface.

In the embodiments of the method, additional fine machining can be carried out, if necessary, after the rough machining. Machining gas can also be directed onto the workpiece 12 during fine machining, which takes place after the rough machining, in order to generate a gas flow and a pressure cushion for optimising the cut edge 20a. In one example, the machining apparatus 100 has a gas supply (not shown) with a non-nozzle-shaped outlet opening for the machining gas for this purpose. This gas supply can be arranged in the machining head 10 or outside thereof. The distance between the outlet opening for the machining gas and the workpiece 12 can be adjusted larger than specified above, in particular substantially larger than 3 mm, during the fine machining.

In all the examples and embodiments described, the machining apparatus can have one or more additional transmissive optical elements (for example lenses) and/or reflective optical elements (for example deflecting mirrors), for example for deflecting the machining laser beam.

Finally, it should be noted that the description of the invention and the exemplary embodiments are not to be understood as limiting in terms of a particular physical realization of the invention. All of the features explained and shown in connection with individual embodiments of the invention can be provided in different combinations in the subject matter according to the invention to simultaneously realise their advantageous effects.

The scope of protection of the present invention is given by the claims and is not limited by the features illustrated in the description or shown in the figures.

It is particularly obvious to a person skilled in the art that the invention can be used not only for laser machining systems, but also for other devices comprising lasers. Furthermore, the components of the machining apparatus for laser machining workpieces can be produced so as to be distributed over several physical products.

| List of reference signs | |
| --- | --- |
| 10 | Machining head |
| 12 | Workpiece |
| 13 | Machining area |
| 13a | Area of the cutting gap |
| 14 | Device for generating a machining laser beam |
| 15 | Machining laser beam |
| 15a | First energy intensity range of the machining laser beam (core region) |
| 15b, 15c | Second energy intensity range of the machining laser beam (edge region) |
| 16 | Device for splitting the machining laser beam |
| 16a | First fibre region (fibre core) |
| 16b, 16c | Further fibre region (fibre jacket ring) |
| 17 | Radiation intensity |
| 17a to 17c | Radiation intensity |
| 18 | Machining laser source |
| 18a | First laser source module of the machining laser source |
| 18b, 18c | Further laser source module of the machining laser source |
| 20 | Cut sheet |
| 20a | Cut edge |
| 20b | Chamfered area of the cut edge |
| 20c | Rounded area of the cut edge |
| 21 | Cut sheet from the prior art |
| 100 | Machining apparatus |
| 160 | Arrow |
| 200 | Machining apparatus |

The invention claimed is:

1. A machining apparatus for laser cutting a workpiece, the machining apparatus comprising:

a device for generating a machining laser beam, for rough machining the workpiece and for producing cuts with cut edges in the workpiece;

a device for splitting the machining laser beam into at least two energy intensity ranges including a first energy intensity range and at least one second energy intensity range, wherein the first energy intensity range is for rough machining of the workpiece and has a greater time-integrated radiation energy than the at least one second energy intensity range for at least partially fine machining a cut edge;

wherein:

the device for splitting the machining laser beam is configured to adjust or select the at least two energy intensity ranges independently of each other, the first energy intensity range is a core region of the machining laser beam and the at least one second energy intensity range is at least one edge region of the machining laser beam, the first energy intensity range and the at least one second energy intensity range are arranged concentrically, and the energy intensity ranges are adapted for rough and fine machining by the device for splitting the machining laser beam, and a control unit, wherein at least one of the device for splitting the machining laser beam and the device for generating a machining laser beam is connected to the control unit in a wired or wireless data-carrying manner and is controllable with the control unit, wherein the device for splitting the machining laser beam is configured to modify a geometry of the cut edge, wherein the device for generating the machining laser beam includes a machining laser source that has a plurality of laser source modules including at least one first laser source module and at least one second laser source module for generating the energy intensity ranges of the machining laser beam; and the device for splitting the machining laser beam includes a laser beam transport fibre having a first fibre region which is a fibre core, and at least one second fibre region in a form of a fibre jacket ring; wherein the at least one first laser source module is configured for generating the first energy intensity range of the machining laser beam and is coupled to the first fibre region of the laser beam transport fibre in a laser light-conducting manner; and the at least one second laser source module is configured for generating one of the at least one second energy intensity ranges of the machining laser beam and is coupled to each of the further fibre regions assigned thereto in a laser light-conducting manner.

2. The machining apparatus according to claim 1, wherein the device for generating the machining laser beam comprises a machining laser source and a laser beam transport fibre; and the device for splitting the machining laser beam includes an optical element for shaping the beam of the machining laser beam.

3. The machining apparatus according to claim 1, wherein the device for splitting the machining laser beam is configured to adjust or select the time-integrated radiation energy of the at least one second energy intensity range with increasing distance from the first energy intensity range; and/or wherein the device for splitting the machining laser beam is configured to round or chamfer the cut edge.

4. The machining apparatus according to claim 1, wherein the device for splitting the machining laser beam is configured to adjust or select at least one of:

at least one or a plurality of powers of the machining laser source or the laser source modules, an intensity distribution perpendicular to a direction of propagation of the machining laser beam, one or a plurality of frequencies of the machining laser beam and/or at least one of the energy intensity ranges of the machining laser beam, a spatial structure of the machining laser beam, the spatial structure including a width and/or a diameter of the machining laser beam, a spatial structure and/or arrangement of the first energy intensity range and/or the at least one second energy intensity range, a feed rate of the machining laser beam, a focus diameter of the machining laser beam and/or of at least one of the energy intensity ranges, a focal position of the machining laser beam and/or of at least one of the energy intensity ranges, and a focusing of the machining laser beam and/or of at least one of the energy intensity ranges.

5. The machining apparatus according to claim 1, further comprising a device for guiding a machining gas the machining gas comprising a cutting gas, onto the workpiece; and/or wherein the device for guiding the machining gas onto the workpiece comprises a nozzle-shaped outlet with an opening for the machining gas, the opening having a diameter in a range of 0.5 to 30 mm, wherein the nozzle-shaped outlet opening is adjustable in a distance from the workpiece to the cut edge in a range from 0 to 3 mm.

6. The machining apparatus according to claim 1, wherein the device for splitting the machining laser beam is configured to at least partially fine machine the cut edge of the workpiece.

* * * * *